Feb. 2, 1932.  J. C. KARNES ET AL  1,843,234
TESTING SEALED CONTAINERS AND METHOD OF TESTING CONTAINERS
Filed March 24, 1931
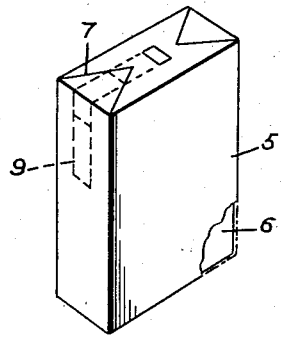
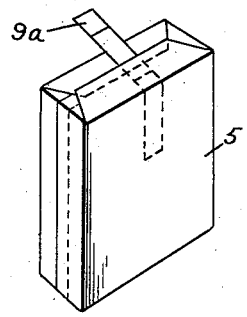
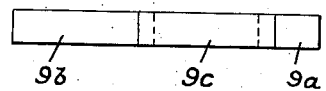
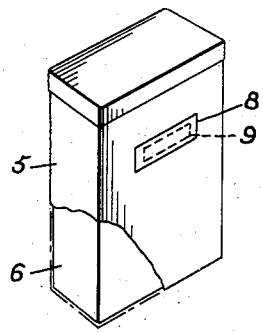
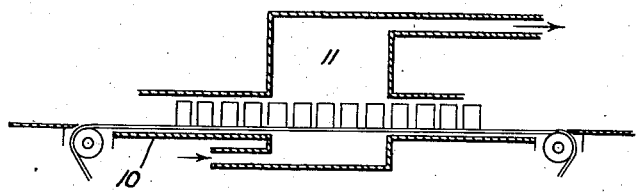
INVENTORS
Gregory J. Kessenich
James C. Karnes
BY W. N. Roach
ATTORNEY Patented Feb. 2, 1932

1,843,234

UNITED STATES PATENT OFFICE

JAMES C. KARNES, OF BUFFALO, NEW YORK, AND GREGORY J. KESSENICH, OF MADISON, WISCONSIN

TESTING SEALED CONTAINERS AND METHOD OF TESTING CONTAINERS

Application filed March 24, 1931. Serial No. 524,938.

(GRANTED UNDER THE ACT OF MARCH 3, 1883, AS AMENDED APRIL 30, 1928; 370 O. G. 757)

The invention described herein may be manufactured and used by or for the Government for governmental purposes without the payment to us of any royalty thereon.

This invention relates to a tested sealed container and to a method of testing containers.

The general purpose of the invention is to provide a method of testing the sealed joints of a casing or container as well as the impermeability of the material of which the container is formed.

A further object of the invention is to associate the indicator utilized in the testing operation with a tear strip arranged to facilitate breaking of the seal at one of the joints.

To these and other ends the invention resides in the novel combination and arrangement of elements and in the method of testing hereinafter described and claimed, it being understood that changes in the precise embodiment of the invention herein disclosed may be made within the scope of the claims without departing from the spirit of the invention.

A practical embodiment of the invention is illustrated in the accompanying drawings, in which:

Fig. 1 is a perspective view of a container provided with a testing indicator associated with a tear strip.

Fig. 2 is a similar view showing a different arrangement of the indicator and tear strip of Fig. 1.

Fig. 3 is a detail plan view of the indicator and tear strip.

Fig. 4 is a perspective view of a container showing the indicator affixed to or forming part of the article within the container, and visible through a window.

Fig. 5 is a more or less diagrammatic illustration in the nature of a longitudinal view of an apparatus for conducting the test.

Referring to Figs. 1 and 2 there is shown a container or casing 5 constituting an outer protective covering or wrapper for an article 6. The container illustrated is of a type that is formed by folding or assembling a sheet or sheets of transparent impermeable material, such as cellophane, and securing the overlapped adjoining or meeting edges 7—7 to establish sealed joints. Where the material of the container is opaque a window 8 is provided as suggested in Fig. 4.

In Figs. 1 and 2 the article 6 within the container is a receptacle or package and represents the contents that are to be protected by the container 5. The contents may be of any nature, such as delicate instruments, chemical and medical substances, combustibles or edibles.

In order to test the impermeability of the container 5 and the effectiveness of the sealed joints 7—7 there is placed within the container an indicator or test paper 9 operable to indicate to the eye usually by its capacity for color change, when subjected to the influence of an appropriate reagent. The operation of submitting the indicator to a test may be conveniently conducted on a large scale by means of the apparatus shown in Fig. 5. The apparatus consists essentially of a conveyor 10 passing through a chamber 11 containing an appropriate reagent, in gaseous or vapor form. If the indicator reacts to the agent notice is given that a leak is present in the container and the container may be repaired or replaced.

The specific nature or character of the indicator and reagent will be dependent on practicability and availability. Illustrations may be found in text books by Cohn—Indicators and Test Paper and by Wilder—Lists of Tests.

Referring now to Figs. 1, 2 and 3 the indicator is arranged to be disposed partially within and partially outside of the container, being passed through one of the joints. In order to prevent the passage of any agent between the outer portion 9a and the inner portion 9b the construction preferably includes an intermediate strip 9c of impermeable material capable of being firmly attached to the material of the container 5 at the joint. When undergoing a test the outer portion 9a should be influenced by the reagent and will afford an indication of the presence and strength of the reagent within the chamber 11. It will be readily understood that the omission of the outer portion 10

9a will not alter or affect the test of the container.

The intermediate strip being externally accessible may serve as a rip cord to facilitate breaking the joint when it is desired to open the container.

In Fig. 4, the indicator is illustrated as being affixed to or forming a part of the article 6, and further as being visible through the window 8.

It is within the purview of the invention to employ an indicator or test paper that is responsive for example to an uncontrolled reagent such as humidity in the atmosphere. This would be extremely advantageous where the container for example is supposed to exclude moisture from the container or to confine moisture within the container. Similarly a manifestation may be obtained of definite reactions resulting from a physical change, such as decomposition and deterioration of the product within the container.

The terms indicator and test paper are used interchangeably and imply the capacity for visible change.

We claim:

1. In combination with a container of transparent impermeable material having sealed joints, an impermeable member extending through one of the sealed joints, and secured to the material of the container, chemically reactive indicators secured to the inside and outside ends of said member.

2. In combination with a container of impermeable material having sealed joints, an impermeable member extending through one of the sealed joints and secured to the material of the container, chemically reactive indicators secured to the inside and outside ends of said member, the inside indicator being visible through the container.

3. In combination with a container of transparent impermeable material having sealed joints, an impermeable member extending through one of the sealed joints and secured to the material of the container, and a chemically reactive indicator associated with said member and disposed within the container.

4. In combination with a container of impermeable material having sealed joints, an impermeable member extending through one of the sealed joints and secured to the material of the container, and a chemically reactive indicator associated with said member and disposed within the container, said indicator being visible through the container.

5. A method of testing the impermeability of containers which consists in disposing an indicator within the container, passing the container through a chamber containing an agent having the power to pass through non-impermeable portions of the material and through unsealed joints to influence the indicator.

6. A method of testing the impermeability of containers which consists in disposing within the container an indicator and subjecting the container to the action of an agent having the power to pass through non-impermeable portions of the material and through unsealed joints to influence the indicator.

7. A method of testing the impermeability of a container made of wrapped flexible material which consists in disposing within the container an indicator, subjecting the container to a gaseous medium having the power to influence the indicator, and examining the indicator.

8. A method of testing the impermeability of a container which consists in disposing within the container an indicator, subjecting the container to an agent having the power to influence the indicator.

9. In combination, a container of impermeable material having sealed joints, and an indicator within the container and visible therethrough and having the ability to respond to a fluid medium capable of passing through non-impermeable portions of the material and through unsealed joints.

10. A method of testing the impermeability of a casing which consists in disposing within the casing an indicator and submitting the casing to the action of an agent having the power to pass through non-impermeable portions of the casing.

11. In combination, a casing of impermeable material, and an indicator within the casing and visible therethrough and having the ability to respond to a medium capable of passing through non-impermeable portions of the material.

12. In combination, a casing of impermeable material, and an indicator within the casing and having the ability to respond to a medium capable of passing through non-impermeable portions of the material.

13. In combination, an article, a casing of impermeable material over the article, and an indicator within the casing having the ability to respond to a medium capable of passing through non-impermeable portions of the material.

14. In combination with a casing of impermeable material, an impermeable member extending through the casing and secured to the material thereof, and a chemically reactive indicator associated with said member and disposed within the casing, said indicator being visible through the casing.

JAMES C. KARNES.
GREGORY J. KESSENICH.